UNITED STATES PATENT OFFICE 1,980,025

ANTHRAQUINONE DYESTUFFS AND PROCESS OF OBTAINING SAME

Arthur Wolfram, Frankfort-on-the-Main-Rodelheim, and Emil Hausdörfer, Hofheim-on-the-Taunus, Germany, assignors to General Aniline Works, Inc., New York, N. Y., a corporation of Delaware No Drawing. Application May 16, 1932, Serial No. 611,754. In Germany May 20, 1931

12 Claims. (Cl. 260—60)

The present invention relates to a process of preparing dyestuffs which are especially suitable for dyeing cellulose esters, for instance, acetate silk and to the dyestuffs obtainable thereby.

The process consists in heating an anthraquinone compound which contains a —NH$_2$— or a —NH—alkyl—group in an alpha-position and at least one —NH—aryl—NH$_2$—group in another alpha-position with a halogenhydrine in the presence of an acid binding agent.

We have found that it is advantageous to carry out the present process in the presence of a solvent or a diluent or to use in the said reaction an excess of halogenhydrine which at the same time acts as a solvent. In this case, the reaction may preferably be carried out by boiling the solution containing the reaction components.

When using an anthraquinone compound which contains an unsubstituted NH$_2$ group in the nucleus, it is possible that 2 mols of halogenhydrine react with the anthraquinone compound containing 2 free amino groups. It has, however, not yet been ascertained definitely whether such a bimolecular condensation takes place in all cases. Apparently in some cases the result depends upon the duration of the boiling operation. By using, for instance, 1 - amino - 4 -(p'- aminophenyl-) amino-anthraquinone and boiling for about half an hour with an excess of halogenhydrine, probably only the phenylamino group enters into reaction whereas when boiling for about 8 hours presumably both amino groups are reacted upon.

In some cases it is, furthermore, advantageous to carry out the reaction under raised pressure.

According to the present process new substances are obtainable, for instance, those which contain compounds of the general probable structure:

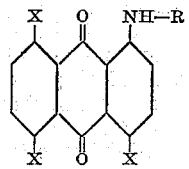

wherein R represents hydrogen, alkyl or the group —alkyl—OH, containing at least once the group —NH—aryl—NH—Y—OH, wherein Y stands for C$_2$H$_4$—, or —C$_3$H$_6$—, in an X-position of the anthraquinone nucleus.

The new compounds very easily dissolve in organic solvents and have a surprisingly good affinity for cellulose esters, for instance, acetate silk.

The following examples serve to illustrate the invention, but they are not intended to limit it thereto, the parts being by weight:

(1) 100 parts of 1-amino-4-(para'-aminophenyl-) amino-anthraquinone are boiled for half an hour with 500 parts of ethylene-chlorhydrine and 30 parts of sodium acetate and the reaction mixture is then introduced into water. The blue precipitate which has separated, is filtered with suction and washed with water until all of the (surplus) remaining ethylene-chlorhydrine and sodium acetate has been removed. The dyestuff thus obtained dyes acetate silk steel-blue, very intense tints. It probably contains the compounds of the following probable constitution:

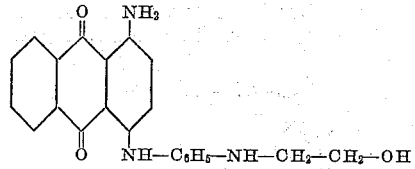

(2) 100 parts of 1-methylamino-4-(para'-aminophenyl-) amino-anthraquinone are introduced in the form of a 10% paste into 500 parts of ethylene-chlorhydrine, 35 parts of potassium acetate are added and the thick paste, thus obtained, is boiled, for half an hour on the oil bath and then introduced into water, while stirring. The reaction product is filtered with suction and washed with water. The dyestuff obtained dyes acetate silk intense green tints. It probably contains the compound of the following probable formula:

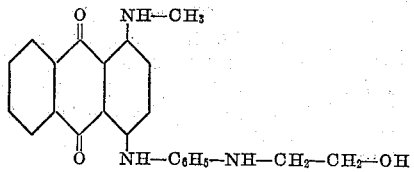

(3) 100 parts of 1-amino-2-methyl-4-(para'-aminophenyl-) amino-anthraquinone are boiled for half an hour with 500 parts of ethylene-chlorhydrine and 30 parts of sodium acetate. After introduction into water, dark blue flakes separate which are filtered with suction and washed. The dyestuff thus obtained dyes acetate silk clear, grey-blue tints.

(4) 100 parts of 1-amino-4-(4'-aminodiphenyl-4''-) amino-anthraquinone are introduced into 500 parts of ethylene-chlorhydrine, 35 parts of potassium acetate are added and the reaction mixture is heated for half an hour on the oil bath at 140° C. The product is worked up as described in the preceding examples and there is obtained a dyestuff which dyes acetate silk intense blue tints.

(5) By causing 1-methylamino-4-(4'-amino-diphenyl-4''-)-amino-anthraquinone to react in the same way, there is obtained a dyestuff which dyes acetate silk blue-green tints.

(6) 100 parts of 1,5-diamino-4,8-di(para'-aminophenyl-) amino-anthraquinone are made into a paste with 500 parts of ethylene-chlorhydrine and 30 parts of sodium acetate are added thereto. The whole is heated on the oil bath, while stirring, up to boiling temperature. Boiling is continued for about half an hour and thereupon the whole is introduced into a large quantity of water. The flakes which have separated, are filtered with suction. The product thus obtained is a blue dyestuff which dyes acetate silk greenish-blue tints.

(7) 100 parts of 1-amino-5-(para'-aminophenyl-) amino-anthraquinone are boiled for about 5 hours with 500 parts of ethylene-chlorhydrine and 30 parts of sodium acetate. The whole is introduced into water and the dark brown flakes which separate are filtered with suction and washed. The dyestuff thus obtained dyes acetate silk brown-red tints.

(8) 100 parts of 1-amino-4-(para'-aminophenyl-)-amino-anthraquinone are boiled for 8 hours with 500 parts of ethylene-chlorhydrine and 30 parts of sodium acetate. The product is worked up as described in Example 1. A dyestuff is obtained which dyes acetate silk considerably more greenish-blue tints than the dyestuff obtainable according to Example 1. It probably contains the compound of the following probable constitution:

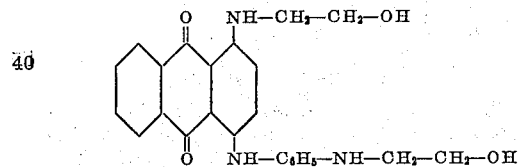

(9) 1000 parts of a 20% aqueous paste of 1-methylamino-4-(para'-aminophenyl-) amino-anthraquinone are heated in an autoclave to about 120° C. with 1000 parts of aqueous ethylene-chlorhydrine of 30% strength and 80 parts of crystallized sodium acetate and heating at about 120° C. is continued for 5 hours, while stirring. Thereupon, the mixture is introduced into water. The product is worked up as described in Example 2. There is obtained a dyestuff which dyes acetate silk the same tints as the dyestuff obtainable according to Example 3. By using in the above examples, propylene chlorhydrine instead of ethylene chlorhydrine, similar dyestuffs are obtained.

We claim:

1. The process which comprises heating an anthraquinone compound which contains a —NH$_2$— or a —NH.alkyl group in an alpha position and at least one —NH-aryl-NH$_2$ group in another alpha-position with a halogenhydrine of the group consisting of ethylene chlorhydrine and propylene chlorhydrine in the presence of an acid binding agent.

2. The process which comprises boiling an anthraquinone compound which contains a —NH$_2$— or a —NH—CH$_3$-group in an alpha-position and at least one —NH-phenyl-NH$_2$-group in another alpha-position with a halogenhydrine of the group consisting of ethylene chlorhydrine and propylene chlorhydrine in the presence of an acid binding agent.

3. The process which comprises boiling an anthraquinone compound which contains a —NH$_2$— or a NH—CH$_3$-group in 1-position and at least one —NH-phenyl-NH$_2$-group in 4- or 5-position with ethylene-chlorhydrine in the presence of an acid binding agent.

4. The process which comprises boiling for half an hour 1-amino-4-(para-aminophenyl)-amino-anthraquinone with an excess of ethylene-chlorhydrine in the presence of sodium acetate.

5. The process which comprises boiling for half an hour 1-methylamino-4-(para-aminophenyl)-amino-anthraquinone with an excess of ethylene-chlorhydrine in the presence of potassium acetate.

6. The process which comprises boiling for 8 hours 1-amino-4-(para-aminophenyl)-amino-anthraquinone with an excess of ethylene-chlorhydrine in the presence of sodium acetate.

7. The compounds substantially identical with those which are obtainable by the process which comprises heating an anthraquinone compound which contains a —NH$_2$— or a —NH-alkyl-group in an alpha-position and at least one —NH-aryl-NH$_2$-group in another alpha-position with a halogenhydrine of the group consisting of ethylene chlorhydrine and propylene-chlorhydrine in the presence of an acid binding agent.

8. The compounds substantially identical with those which are obtainable by the process which comprises boiling an anthraquinone compound which contains a —NH$_2$— or a —NH—CH$_3$-group in an alpha-position and at least one —NH-phenyl-NH$_2$-group in another alpha-position with a halogen-hydrine of the group consisting of ethylene chlorhydrine and propylene chlorhydrine in the presence of an acid binding agent.

9. The compounds substantially identical with those which are obtainable by the process which comprises boiling an anthraquinone compound which contains a NH$_2$— or a —NH—CH$_3$-group in 1-position and at least one —NH-phenyl-NH$_2$-group in 4- or 5-position with ethylene-chlorhydrine in the presence of an acid binding agent.

10. The compound substantially identical with that which is obtainable by the process which comprises boiling for half-an-hour 1-amino-4-(para-aminophenyl)-amino-anthraquinone with an excess of ethylene-chlorhydrine in the presence of sodium acetate, dyeing acetate silk very intense steel-blue tints.

11. The compound substantially identical with that which is obtainable by the process which comprises boiling for half-an-hour 1-methylamino-4-(para-aminophenyl)-amino-anthraquinone with an excess of ethylene-chlorhydrine in the presence of potassium acetate, dyeing acetate silk intense green tints.

12. The compound substantially identical with that which is obtainable by the process which comprises boiling for 8 hours 1-amino-4-(para-aminophenyl)-amino-anthraquinone with an excess of ethylene-chlorhydrine in the presence of sodium acetate, dyeing acetate silk very intense steel-blue tints of a greenish hue.

ARTHUR WOLFRAM.
EMIL HAUSDÖRFER.